US008296182B2

(12) United States Patent
Chari et al.

(10) Patent No.: US 8,296,182 B2
(45) Date of Patent: Oct. 23, 2012

(54) COMPUTER-IMPLEMENTED MARKETING OPTIMIZATION SYSTEMS AND METHODS

(75) Inventors: Manoj Keshavmurthi Chari, Cary, NC (US); Balaji Gopalakrishnan, Cary, NC (US); Yi Liao, Apex, NC (US); Michelle Gail Opp, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 977 days.

(21) Appl. No.: 12/194,826

(22) Filed: Aug. 20, 2008

(65) Prior Publication Data
US 2010/0049535 A1 Feb. 25, 2010

(51) Int. Cl.
G06Q 30/00 (2012.01)
G06Q 10/00 (2012.01)
(52) U.S. Cl. .................... 705/14.43; 705/14.4; 705/7.36
(58) Field of Classification Search .................. 705/1, 7, 705/14, 36
See application file for complete search history.

(56) References Cited

U.S. PATENT DOCUMENTS

| 5,627,973 | A | | 5/1997 | Armstrong et al. |
| 5,652,842 | A | | 7/1997 | Siegrist, Jr. et al. |
| 5,767,854 | A | | 6/1998 | Anwar |
| 5,799,286 | A | | 8/1998 | Morgan et al. |
| 5,926,820 | A | | 7/1999 | Agrawal et al. |
| 5,953,707 | A | | 9/1999 | Huang et al. |
| 5,963,910 | A | * | 10/1999 | Ulwick ........................ 705/7.28 |
| 5,999,908 | A | | 12/1999 | Abelow |
| 6,009,407 | A | | 12/1999 | Garg |
| 6,014,640 | A | | 1/2000 | Bent |
| 6,029,139 | A | | 2/2000 | Cunningham et al. |
| 6,078,892 | A | | 6/2000 | Anderson et al. |
| 6,115,691 | A | | 9/2000 | Ulwick |
| 6,151,582 | A | | 11/2000 | Huang et al. |
| 6,182,060 | B1 | | 1/2001 | Hedgcock et al. |
| 6,236,977 | B1 | | 5/2001 | Verba et al. |
| 6,237,138 | B1 | | 5/2001 | Hameluck et al. |

(Continued)

FOREIGN PATENT DOCUMENTS
WO        WO 01/11522        2/2001

OTHER PUBLICATIONS

Bertsimas et al., "Introduction to Linear Optimization" Athena Scientific, Belmont, Massachusetts, 1997, pp. 505-506, 530.

(Continued)

*Primary Examiner* — Matthew Gart
*Assistant Examiner* — Reva R Danzig
(74) *Attorney, Agent, or Firm* — Jones Day

(57) ABSTRACT

Computer-implemented systems and methods are provided for determining an action item from a global set of action items for a plurality of customers based on an objective function, a plurality of individual constraints, and a plurality of aggregate constraints. A plurality of offer sets is generated for each customer. An approximate highest reduced adjusted objective for each of the offer sets for each customer is calculated, and the customers are bucketed based on the highest adjusted objective value associated with each customer. The buckets are collapsed into a single bucket record containing a plurality of aggregate offer set columns, and an aggregate offer set column is selected from each bucket record for each bucket. Each bucket associated with a selected offer set is disaggregated, and the action item included in the selected offer set is stored in a computer-readable memory.

19 Claims, 14 Drawing Sheets

U.S. PATENT DOCUMENTS

| | | | |
|---|---|---|---|
| 6,249,768 B1 | 6/2001 | Tulskie et al. | |
| 6,275,812 B1 | 8/2001 | Haq et al. | |
| 6,286,005 B1 | 9/2001 | Cannon | |
| 6,321,206 B1 | 11/2001 | Honarvar | |
| 6,397,224 B1 | 5/2002 | Zubeldia et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,039,594 B1 | 5/2006 | Gersting | |
| 7,089,266 B2 | 8/2006 | Stolte et al. | |
| 7,092,929 B1 | 8/2006 | Dvorak et al. | |
| 7,133,876 B2 | 11/2006 | Roussopoulos et al. | |
| 7,346,538 B2 | 3/2008 | Reardon | |
| 7,370,366 B2 | 5/2008 | Lacan et al. | |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1* | 5/2003 | Weaver et al. | 705/10 |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0208402 A1 | 11/2003 | Bibelnieks et al. | |
| 2003/0208420 A1 | 11/2003 | Kansal | |
| 2003/0236721 A1 | 12/2003 | Plumer et al. | |
| 2004/0093296 A1* | 5/2004 | Phelan et al. | 705/36 |
| 2004/0103051 A1* | 5/2004 | Reed et al. | 705/36 |
| 2004/0111388 A1* | 6/2004 | Boiscuvier et al. | 707/1 |
| 2004/0199781 A1 | 10/2004 | Erickson et al. | |
| 2005/0033761 A1 | 2/2005 | Guttman et al. | |
| 2005/0066277 A1 | 3/2005 | Leah et al. | |
| 2005/0262108 A1 | 11/2005 | Gupta | |
| 2005/0289000 A1* | 12/2005 | Chiang et al. | 705/14 |
| 2007/0055482 A1 | 3/2007 | Goodermote et al. | |
| 2007/0174119 A1 | 7/2007 | Ramsey et al. | |

OTHER PUBLICATIONS

International Search Report, issued Jun. 22, 2004, for International Application PCT/US03/13394.

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting a Managerial Emphasis", Tenth Edition, Chapter 14, pp. 497-534, 2000.

"Advances in Mathematical Programming and Optimization in the SAS System" by Keamey, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"12 Technologies: i2 releases i2 five.two—the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

* cited by examiner

US 8,296,182 B2

COMPUTER-IMPLEMENTED MARKETING OPTIMIZATION SYSTEMS AND METHODS

TECHNICAL FIELD

This document relates generally to computer-implemented optimization systems and more particularly to computer-implemented marketing campaign optimization.

BACKGROUND

Direct marketing approaches are constantly evolving and becoming more complex. In addition to traditional methods of making an offer through direct mail or telemarketing, channels such as email or online offers through a website have increased the number of campaigns that the marketer may consider. Furthermore, advances in analytical software in recent years have provided marketers with better predictive models of their customer behavior, and these models often have a very high degree of sophistication. For example, it is not uncommon to have separate models of response probability for an offer, such as a credit card offer, through the call center, direct mail, and email. The marketer would like to use this information to determine the best course of action when deciding which customers should receive each offer through each channel. An objective is to maximize or minimize some quantitative measure of the offers that are made, such as maximizing the expected response probability or the expected profit, or minimizing total cost. As a further complication to the problem, marketing actions are limited by business constraints that are to be satisfied. These constraints could be divided into categories such as: aggregate constraints and contact policy ("individual") constraints.

Aggregate constraints involve a limit that is applied over a large number of customers, whether it is the entire customer population or a subset of the customers. For example, constraints on budgets, channel usage, and the number of offers made are types of aggregate constraints, as are constraints on measures such as overall average return, behavior, or risk. An aggregate constraint does not apply to the offer decisions associated with an individual customer but rather concerns the overall impact of making offers to a large group of customers.

On the other hand, contact policy constraints impose restrictions on the combinations of offers that can be made to individual customers. Thus, unlike aggregate constraints, each contact policy constraint involves only the offer decisions associated with a single customer. For example, a contact policy constraint might state that a customer can receive no more than two credit card offers every six weeks, or it might specify that if a customer receives an email offer, then he cannot receive an offer through the call center for at least two weeks.

FIG. 1 is a block diagram depicting a process 30 for planning a marketing campaign. In planning a campaign, a campaign manager defines the offers and the mechanisms for delivering offers for the campaign as shown at 32. Prior to campaign execution 40, a statistical modeler develops statistical models 34 predicting the effectiveness of different offer/delivery mechanism combinations. A marketing analyst receives the campaign definition 32 as well as the statistical models 34 and attempts to optimize the campaign strategy 36. For example, the marketing analyst may seek to maximize predicted revenues from the selected campaigns within a given marketing budget. The marketing analyst's optimization process may be an iterative one where the analyst examines the optimization reports 38 and repeats the optimization procedures 36 if he believes that the campaign strategy can be bettered (e.g., through modification of the objective, constraints, or contact policies). Once a campaign strategy is decided upon, a campaign manager executes the selected strategy 40.

FIG. 2 is a depiction of an example marketing campaign 50. In this campaign 50, a marketing strategy is sought that provides selected offers from a plurality of offers 52 to a plurality of customers 54. In the example of FIG. 2, the marketing analyst selects among three offers (i.e., providing a Visa Classic card, a Visa Gold card, or a Home Equity Loan) and three contact methods (i.e., providing the offer by direct mail, over the phone through a call center, or in person at a branch office) resulting in nine possible campaign alternatives 52 for each of the plurality of customers 54. Each of the customer-campaign alternative combinations has a value (55, 56, 57) associated with the combination. In the example of FIG. 2, this value (55, 56, 57) is an expected return from the customer-campaign alternative combination (i.e., a call center offer of a Visa Classic card to customer #1 has an expected return of $4.90 as shown at 55). The expected return value may be calculated through evaluation of an objective function.

FIG. 3 is a further depiction of the example marketing campaign illustrating a large number of customer-campaign alternative combinations 60. The example of FIGS. 2 and 3, having nine customers and nine campaign alternatives, results in 81 possible customer-campaign alternative combinations if each customer is to receive one campaign offer 52. One can see from this simplified example that a more realistic marketing campaign having potentially millions of customers and twenty or thirty candidate offers 52 becomes extremely complex and difficult to manage. For example, a system having three million customers and twenty-five campaign options would result in seventy-five million customer-campaign alternative combinations.

The complexity of the marketing campaign is further exacerbated by the introduction of constraints. As described above, many different constraints may be involved, such as aggregate constraints involving a limit placed over the global set of customers, individual constraints that dictate rules for each individual customer, etc. FIG. 4 is a diagram illustrating a visualization 70 of a marketing optimization problem. The objective function 72 to be maximized or minimized and the aggregate constraints 74 are represented on one row each as they are applicable to all of the customers. Each customer's contact policy constraints are then assigned a block 76, 78, 80.

One can quickly see how the structure of FIG. 4 becomes large in a real-world marketing problem having millions of customers. For example, the system described above, having three million customers, would result in a visualization structure having three million sets of blocks. Combined with seventy-five million customer-campaign alternative combinations, marketing campaigns on this scale become difficult to manage and timely solve for an optimum solution.

SUMMARY

In accordance with the teachings provided herein, computer-implemented systems and methods are provided for determining an action item from a global set of action items for a plurality of customers based on an objective function, a plurality of individual constraints, and a plurality of aggregate constraints. As an illustration, a system combines the plurality of aggregate constraints with the global set of action items such that records associated with each member of the global set of action items identify the aggregate constraints with which that member of the global set of action items is associated in a bit-wise fashion in order to create a measures data structure. The system generates a plurality of offer sets for each customer that include an action item from the global set of action items in each offer set based on objective coefficients calculated in memory utilizing the measures data structure and the plurality of individual constraints. The system selects an offer set for each customer from the plurality of generated offer sets for that customer such that the objective function is maximized and stores the action item included in the selected offer set in a computer-readable memory.

As another illustration, a system generates a first plurality of offer sets for each customer that include an action item from a global set of action items in each offer set based on an objective function. A Lagrange relaxation technique is applied to the objective function based on the plurality of aggregate constraints to generate a relaxed objective function. The system applies a subgradient algorithm to the relaxed objective function based on the first plurality of offer sets to calculate a first upper bound objective value. The system then generates a second plurality of offer sets based on an adjusted objective function. The subgradient algorithm is reapplied to the relaxed objective function based on the second plurality of offer sets to calculate a second upper bound objective value. The system compares the second upper bound objective value to the first upper bound objective value, appends the second plurality of offer sets to the first plurality of offer sets, and stores the first plurality of offer sets in a computer-readable medium. The system then repeats the steps of generating a second plurality of offer sets, reapplying the subgradient algorithm, and appending the second plurality of offer sets if the difference between the second upper bound objective value and the first upper bound objective value is greater than a threshold value.

As another illustration, a system generates a plurality of offer sets for each customer that include an action item from the global set of action items in each offer set. An approximate highest adjusted objective value for each of the generated offer sets for each customer is calculated, and the customers are bucketed based on the highest adjusted objective value associated with each customer. The buckets are collapsed into a single bucket record containing a plurality of aggregate offer set columns, and an aggregate offer set column is selected from each bucket record for each bucket. The system disaggregates each bucket to associate a selected offer set with each customer in the bucket according to the selected aggregate offer set column for the bucket, and the action item included in the selected offer set is stored in a computer-readable memory.

As yet another illustration, a system generates a plurality of offer sets for each customer that include an action item from the global set of action items in each offer set. An approximate highest adjusted objective value for each of the generated offer sets for each customer is calculated, and the customers are bucketed based on the highest adjusted objective value associated with each customer. The buckets are collapsed into a single bucket record containing a plurality of aggregate offer set columns, and an aggregate offer set column is selected from each bucket record for each bucket. The system disaggregates each bucket to associate a selected offer set with each customer in the bucket according to the selected aggregate offer set column for the bucket. A portion of the customer-selected offer set associations are retained as final customer-selected offer sets. The bucketing, collapsing, selecting, disaggregating, and retaining are then repeated using a smaller bucket size. The system stores the action item included in the final customer-selected offer set in a computer-readable medium.

DETAILED DESCRIPTION

Figure 1:
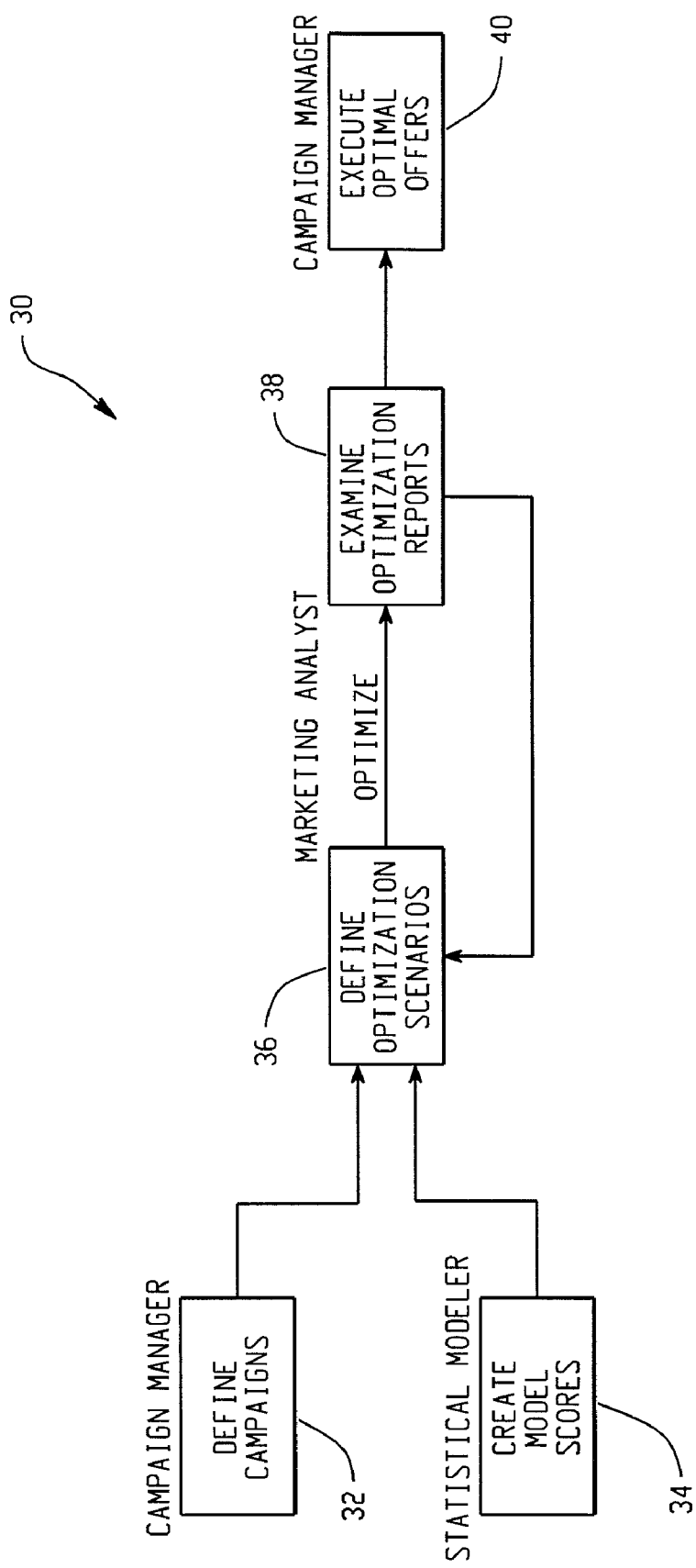
FIG. 1 is a block diagram depicting a process for planning a marketing campaign.
Figure 2:
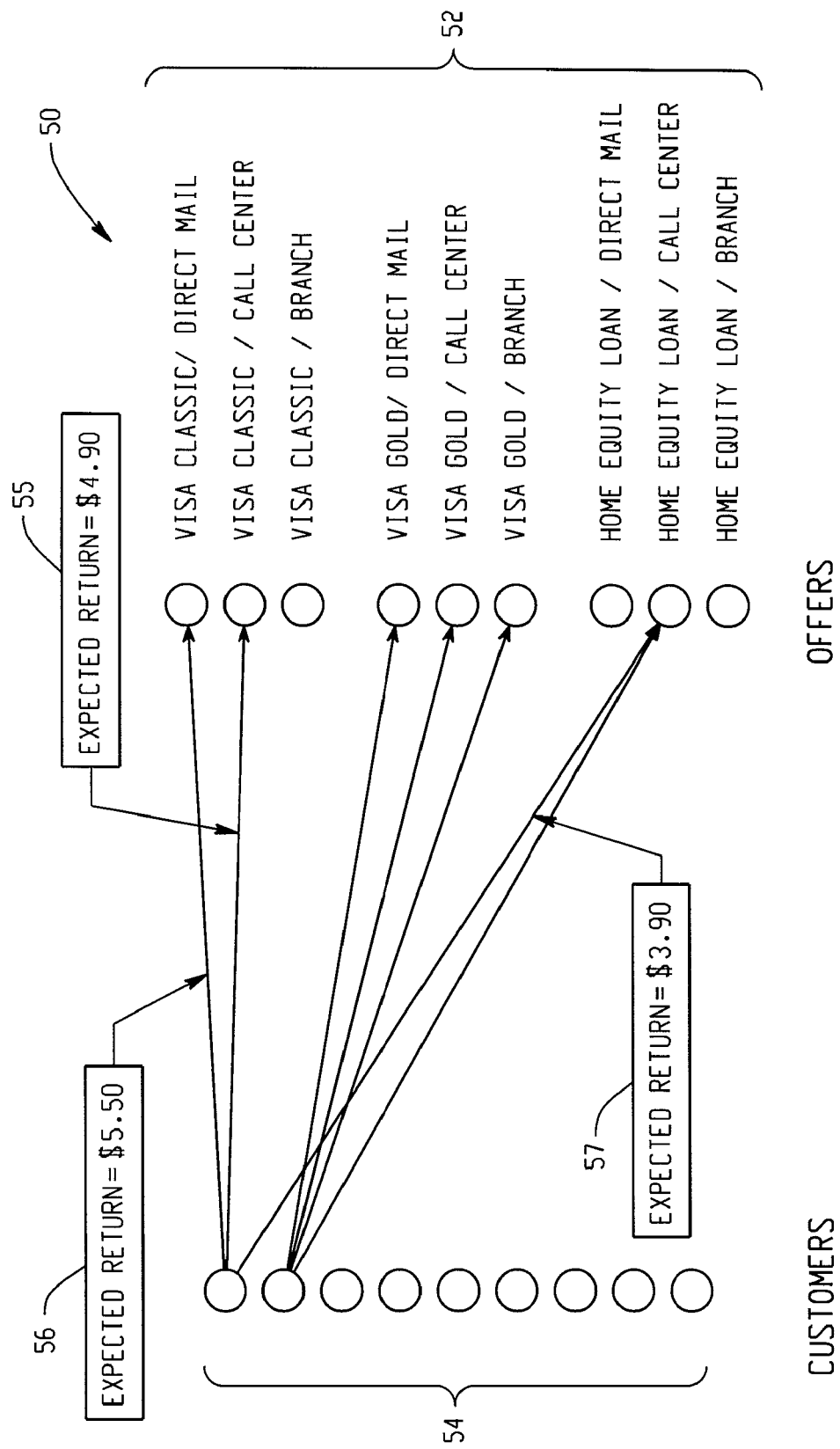
FIG. 2 is a depiction of an example marketing campaign.
Figure 3:
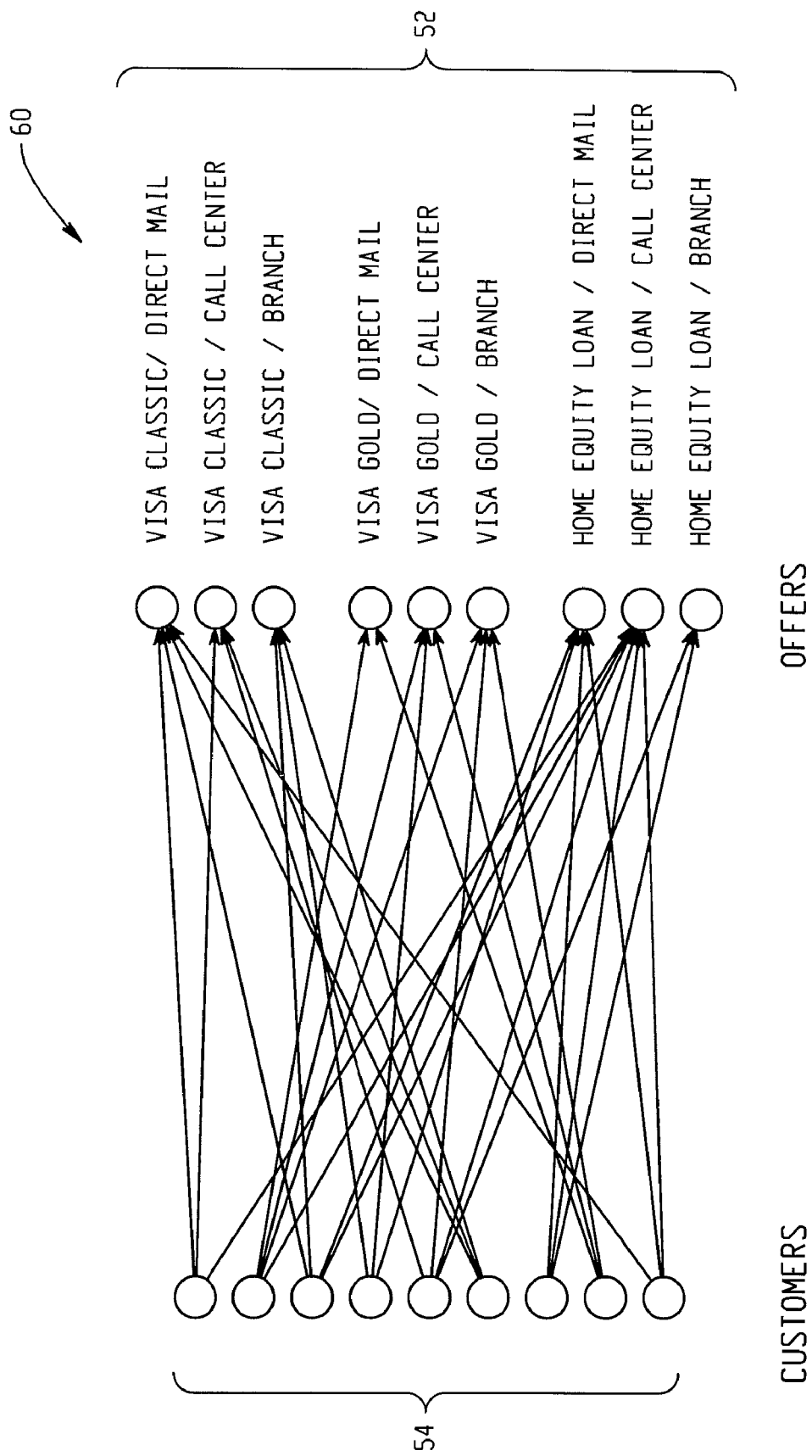
FIG. 3 is a further depiction of the example marketing campaign illustrating a large number of customer-campaign alternative combinations.
Figure 4:
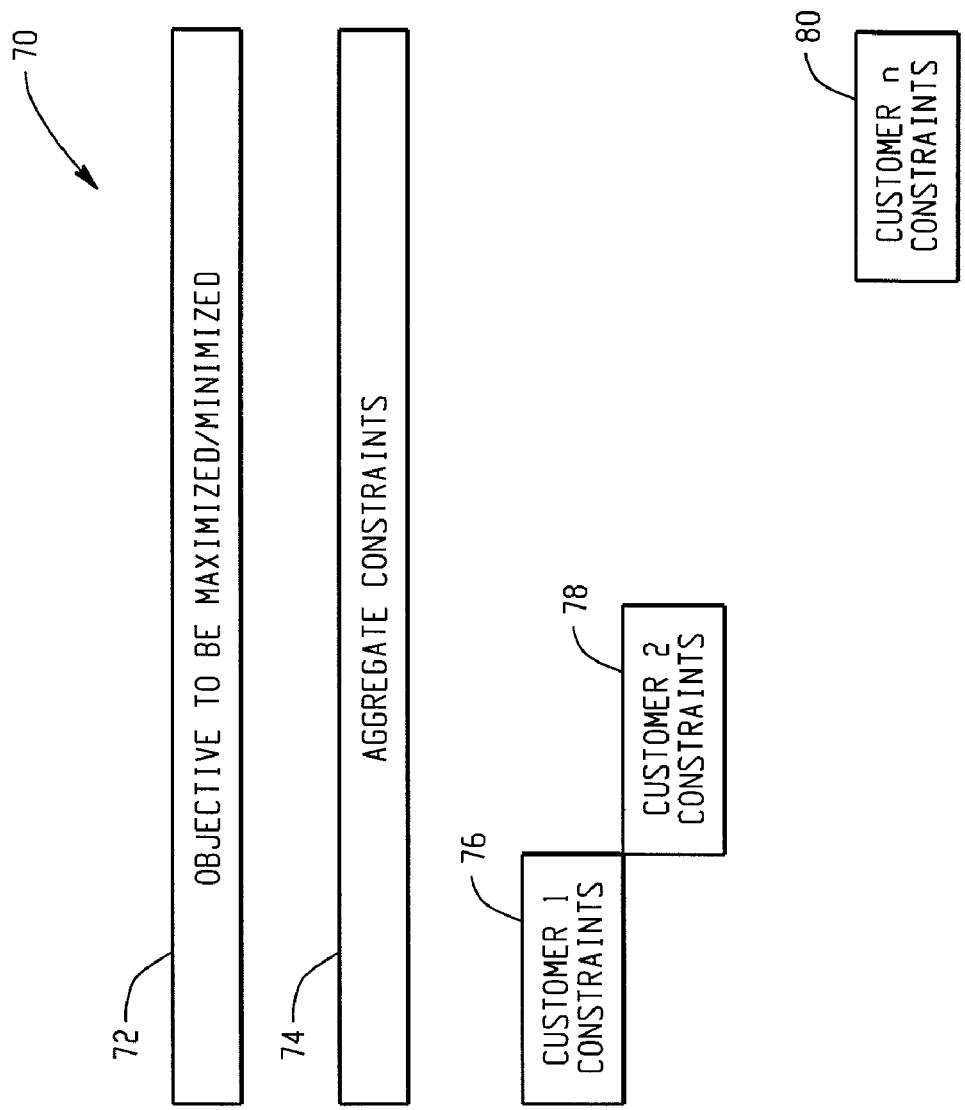
FIG. 4 is a diagram illustrating a form of visualizing a marketing optimization problem.
Figure 5:
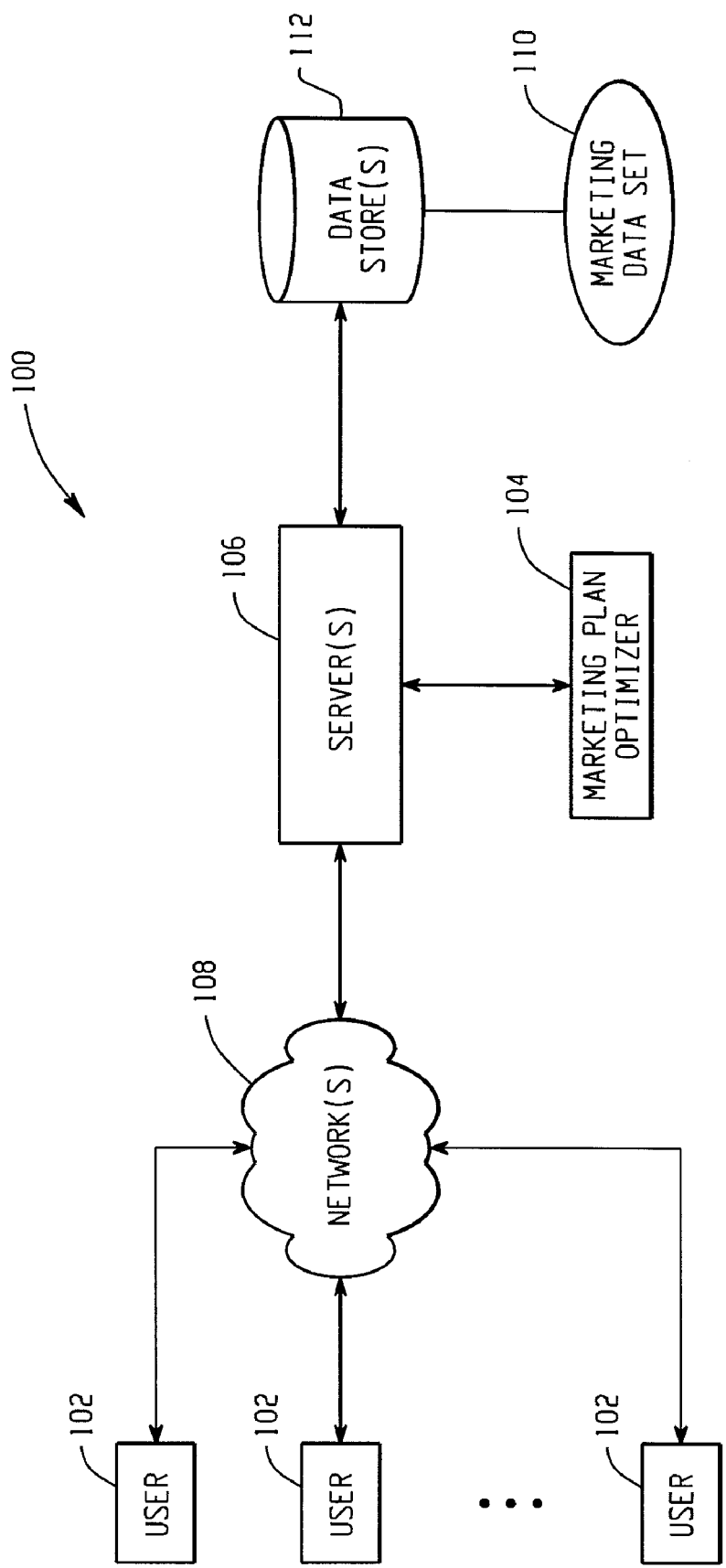
FIG. 5 is a block diagram depicting a computer-implemented environment wherein users can interact with the marketing plan optimizer system.

FIG. 5 depicts at 100 a computer-implemented environment where users 102 can interact with a marketing plan optimizer 104 hosted on one or more servers 106 through a network 108. The system 104 contains software operations or routines for generating an optimum or a near-optimum marketing campaign utilizing marketing data 110 housed in one or more data stores 112.

The marketing plan optimizer 104 can be an integrated web-based analysis tool that provides users flexibility and functionality for performing marketing plan optimization or can be a wholly automated system. The system 104 may also be implemented on a standalone computer or other platforms. One or more data stores 112 can store the data to be analyzed by the system 104 as well as any intermediate or final data generated by the system 104. For example, the data store(s) 112 can store marketing data 110 that identifies an objective function, aggregate constraints, individual constraints, etc. Examples of data store(s) 112 can include flat files, relational database management systems (RDBMS), a multi-dimensional database (MDDB), such as an Online Analytical Processing (OLAP) database, etc.

The users 102 can interact with the system 104 through a number of ways, such as over one or more networks 108. One or more servers 106 accessible through the network(s) 108 can host the marketing plan optimizer 104. It should be understood that the marketing plan optimizer 104 could also be provided on a stand-alone computer for access by a user.

Figure 6:
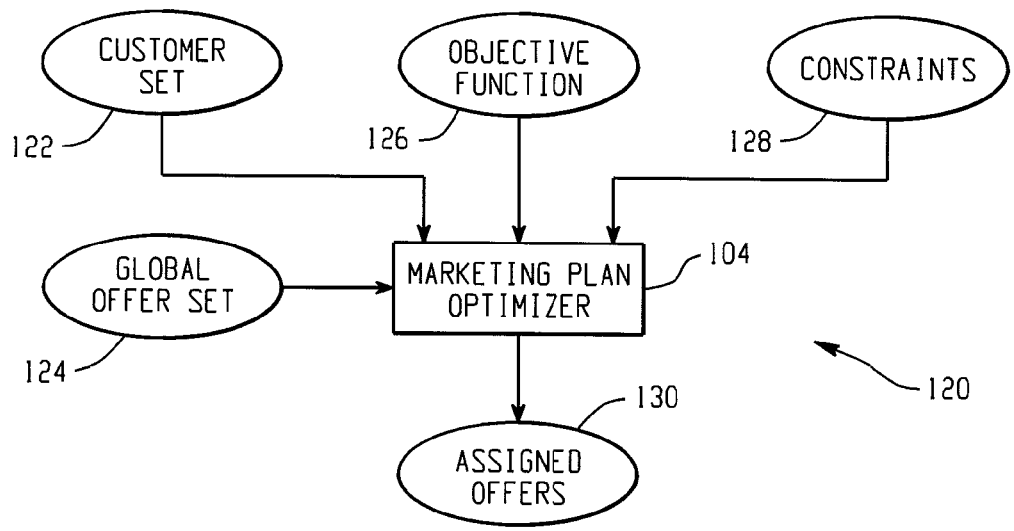
FIG. 6 is a flow diagram illustrating the inputs and outputs to the marketing plan optimizer.

FIG. 6 is a flow diagram illustrating at 120 the inputs and outputs to a marketing plan optimizer 104. The marketing plan optimizer 104 receives a set of customers 122 to whom offers should be made. The system further receives a global offer set 124 from which offers are selected to be sent to customers within the customer set 122. An objective function 126 is received by the marketing plan optimizer for calculating an objective value for different combinations of entities from the customer set 122 and the offer set 124. The marketing plan optimizer 104 further receives constraints 128 to be satisfied by any final marketing plan solution. The marketing plan optimizer 104 outputs a set of assigned offers 130 detailing the offer sets to be given to each customer in the customer set 122. The assigned offers 130 for each customer may include zero, one, or more than one offers from the global offer set 124.

As an example, a bank may consider two types of offers. First, for customers who already have a checking account in good standing, the bank would potentially like to offer the customer an attractive interest rate on a home mortgage. This offer may be identified as UPSELL_MORTGAGE. In this example, the bank may make offers through direct mail or a call center. This results in a total of four distinct offers: UPSELL_MORTGAGE_MAIL, UPSELL_MORTGAGE_CALL, NEW_CHECKING_MAIL, and NEW_CHECKING_CALL. In addition, it costs one dollar to make an offer through direct mail and five dollars to make a call through the call center.

For each potential customer-offer assignment, the bank is able to estimate the long term value ("LTV") of making such an assignment based on an objective function. The bank would like to determine which set of customers should receive each offer through each channel. In doing so, the bank seeks to maximize the LTV. However, the bank is also to satisfy the following business constraints: the bank's total budget for the campaign is $450,000; the call center can handle a maximum of 100,000 calls; the bank seeks to limit their risk exposure by ensuring that the average credit score among customers who receive the home mortgage offer is at least 700. Furthermore, the bank wants to ensure that each customer receives at most one offer. In other words, a customer should not receive the mortgage offer through both the mail and the call center, and a customer should not receive both the mortgage and the checking offer.

The objective function includes the quantity that the bank seeks to maximize or minimize. In the above example, the objective is to maximize the LTV. Other examples of objectives could include maximizing the expected number of responses, maximizing profit, or minimizing total cost.

The budget, call center capacity, and average credit score constraints are examples of aggregate constraints. The restriction that each customer may receive at most one offer is an example of an individual constraint. In general, these individual constraints may become complex for each customer and include constraints such as: a customer may receive at most one email per week; a customer may receive at most one offer from the Visa card campaign; a customer may receive at most two offers during any one month; a customer may receive at most four offers in total; or a customer must receive at least one offer in January.

The marketing optimization problem in this example may be mathematically represented as follows. The problem seeks to maximize or minimize the objective function:

$$\Sigma c_j x_j,$$

where $c_j$ represents the return on investment vector of the eligible offers for customer j, and $x_j$ represents a 0/1 decision vector for customer j. The objective function is minimized or maximized subject to one or more constraints:

$$\Sigma A_j x_j \leq b$$

$$(x_1, x_2, \ldots, x_r) \in P$$

$$P = P_1 \times P_2 \times \ldots \times P_r,$$

where $A_j$ represents the aggregate constraint information for customer j, and $P_j$ represents the set of all decision vectors that satisfy contact policy constraints for customer j.

Figure 7:
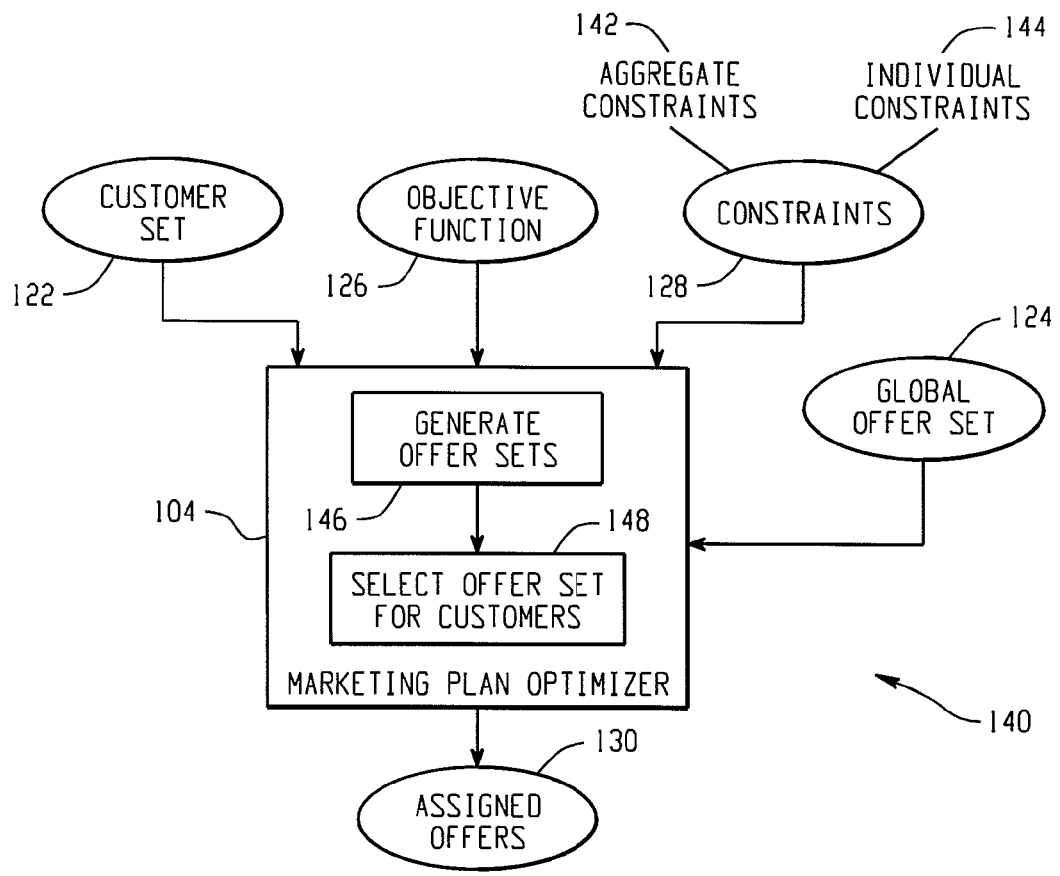
FIG. 7 is a flow diagram illustrating steps for assigning offers to customers.

FIG. 7 is a flow diagram illustrating at 140 steps for assigning offers to customers. The marketing plan optimizer 104 receives the customer set 122, global offer set 124, and an objective function 126. The marketing plan optimizer 104 further receives a set of constraints 128 which include aggregate constraints 142 and individual constraints 144. The marketing plan optimizer 104 processes these inputs to generate a set of assigned offers 130 for each customer. The marketing plan optimizer may generate these assigned offers via a multi-step process. The marketing plan optimizer 104 first generates a plurality of offer sets 146 for each customer. These offer sets may include zero, one, or more than one offers from the global offer set 124. The marketing plan optimizer 104 then selects an offer set 148 for each customer from the plurality of candidate offer sets generated for that customer in step 146. The marketing plan optimizer 104 outputs the offer set selected in step 148 as the assigned offers 130.

Figure 8:
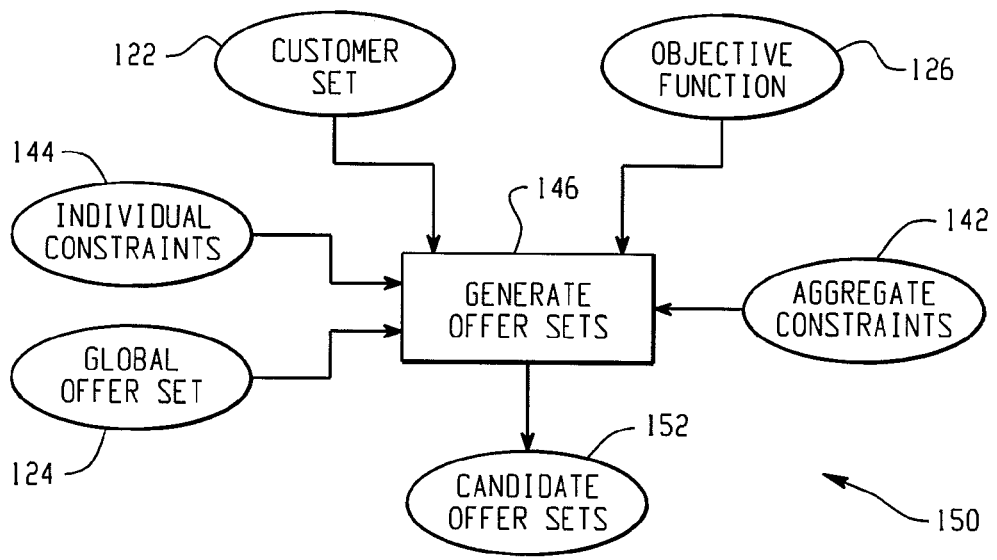
FIG. 8 is a flow diagram illustrating the inputs and outputs to the generate offer sets step.

FIG. 8 is a flow diagram illustrating at 150 the inputs and outputs to the generate offer sets step 146. The offer set generator 146 receives the customer set 122 and the global offer set 124. The generator 146 further receives the aggregate constraints 142 and the individual constraints 144. The offer set generator 146 generates a plurality of candidate offer sets 152 for each customer. These candidate offer sets 152 are generated with the objective function 126 such that they help achieve a high (or low) objective value while being likely to satisfy both the aggregate 142 and individual constraints 144.

Due to the potential for a very large number of customers requiring offer set generation, the generating offer step may be reduced in complexity through recognition that many customers may have identical individual constraints 144. If two customers are eligible for the same set of offers and share the same contact policy, then the offer sets generated for one customer are also feasible for the other. Because many customers may have the same eligibility and contact policy, the generate offer sets step 146 may draw a random sample of customers for which to generate offer sets. The generate offer sets step 146 may then apply those offer sets to similar customers.

Figure 9:
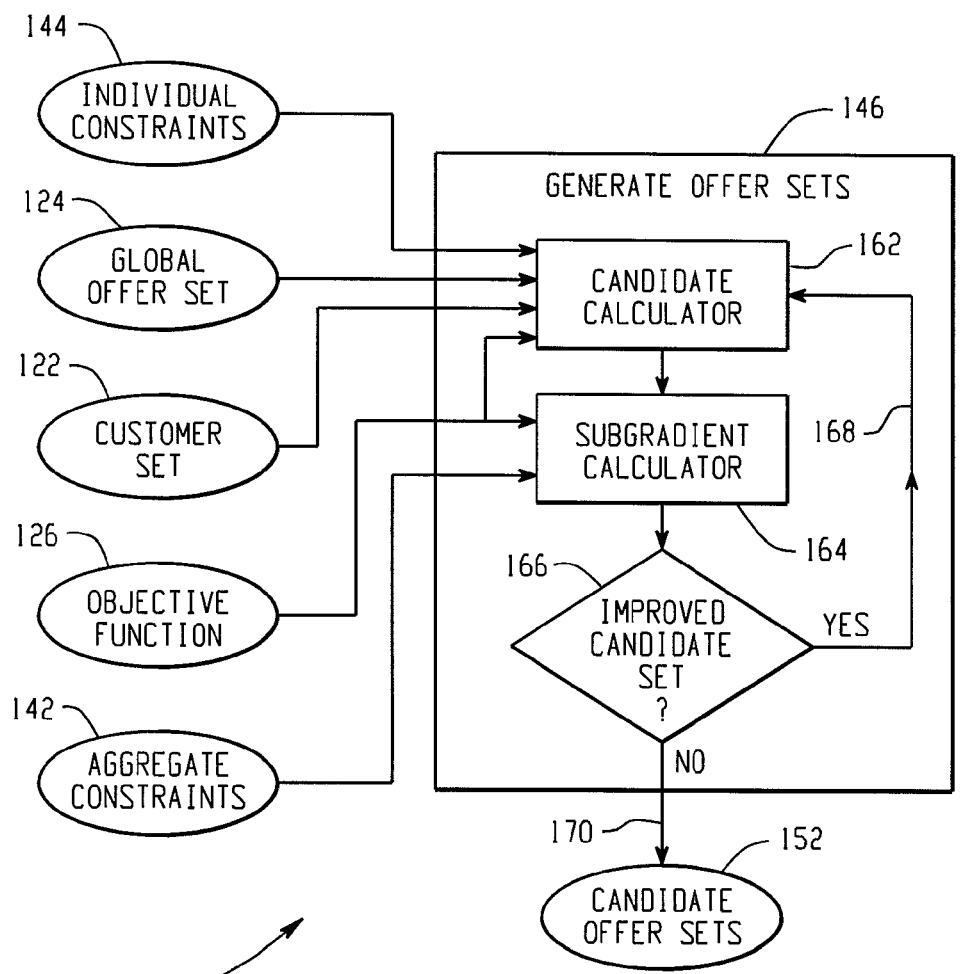
FIG. 9 is a block diagram illustrating components within a generate offer sets step.

FIG. 9 is a block diagram illustrating at 160 components within the generate offer sets step 146. The generate offer set step 146 includes a candidate calculator 162. The candidate calculator 162 generates a plurality of candidate offer sets 152. In generating a plurality of candidate offer sets 152, the candidate calculator is configured to solve a binary integer programming problem considering the customer set 122, the global offer set 124, the objective function 126, and the individual constraints 144 in the first iteration. In later iterations, the candidate calculator may consider the objective function 126 adjusted by the aggregate constraints 142 and calculated opportunity cost values as will be discussed below with reference to FIG. 11. The binary integer programming problem may be solved utilizing an OCTANE heuristic. An OCTANE heuristic is described in detail at: "OCTANE: A New Heuristic for Pure 0-1 Programs," Balas, Egon; Ceria, Sebastián; Dawande, Milind; Margot, Francois; Pataki, Gábor, Operations Research, 2001 Informs, Vol. 49, No. 2, March-April 2001, pp. 207-225, which is herein incorporated in its entirety by reference. Because an OCTANE heuristic returns multiple feasible solutions along its search path, the number of binary integer programming problems required to calculate a number of feasible offer sets is limited. Because the binary integer programming problems are independent of one another, parallel processing of the generating offer set step 146 may be used to speed computation.

The generate offer sets step 146 further includes a subgradient calculator 164. The subgradient calculator 164 receives the objective function 126 and the aggregate constraints 142. The subgradient calculator also receives the candidate offer sets 152 generated by the candidate calculator 162. The subgradient calculator 164 determines a first quality value identifying the quality of the first generated candidate offer set 152. A quality determination is then made as illustrated at 166. Block 166 determines whether there has been a significant quality improvement in the candidate offer set 152 from the previous iteration. Because there is no previous iteration for comparison on the first time through the generate offer sets loop 146, the yes branch 168 is taken.

Following the yes branch 168, the candidate calculator 162 generates a second plurality of candidate offer sets 152, which is appended to the prior candidate offer sets 152 to be provided to the selection step 148 depicted in FIG. 7. The subgradient calculator then determines a second quality value identifying the quality of the second generated candidate offer set 152. If there has been a significant increase in quality (e.g., the difference between the first quality value and the second quality value is relatively large), then it is likely that a further iteration of the generate offer sets step 146 will be beneficial, and the yes branch 168 is taken. If there has not been a significant increase in quality over the previous iteration (e.g., the difference between the first quality value and the second quality value is small and less than a specified threshold value), then the benefit of another iteration through the generate offer sets step 146 is deemed outweighed by the required processing time for executing that iteration. Thus, the no branch 170 is taken and the existing candidate offer set 152 for that customer is output from the generate offer sets step 146.

Figure 10:
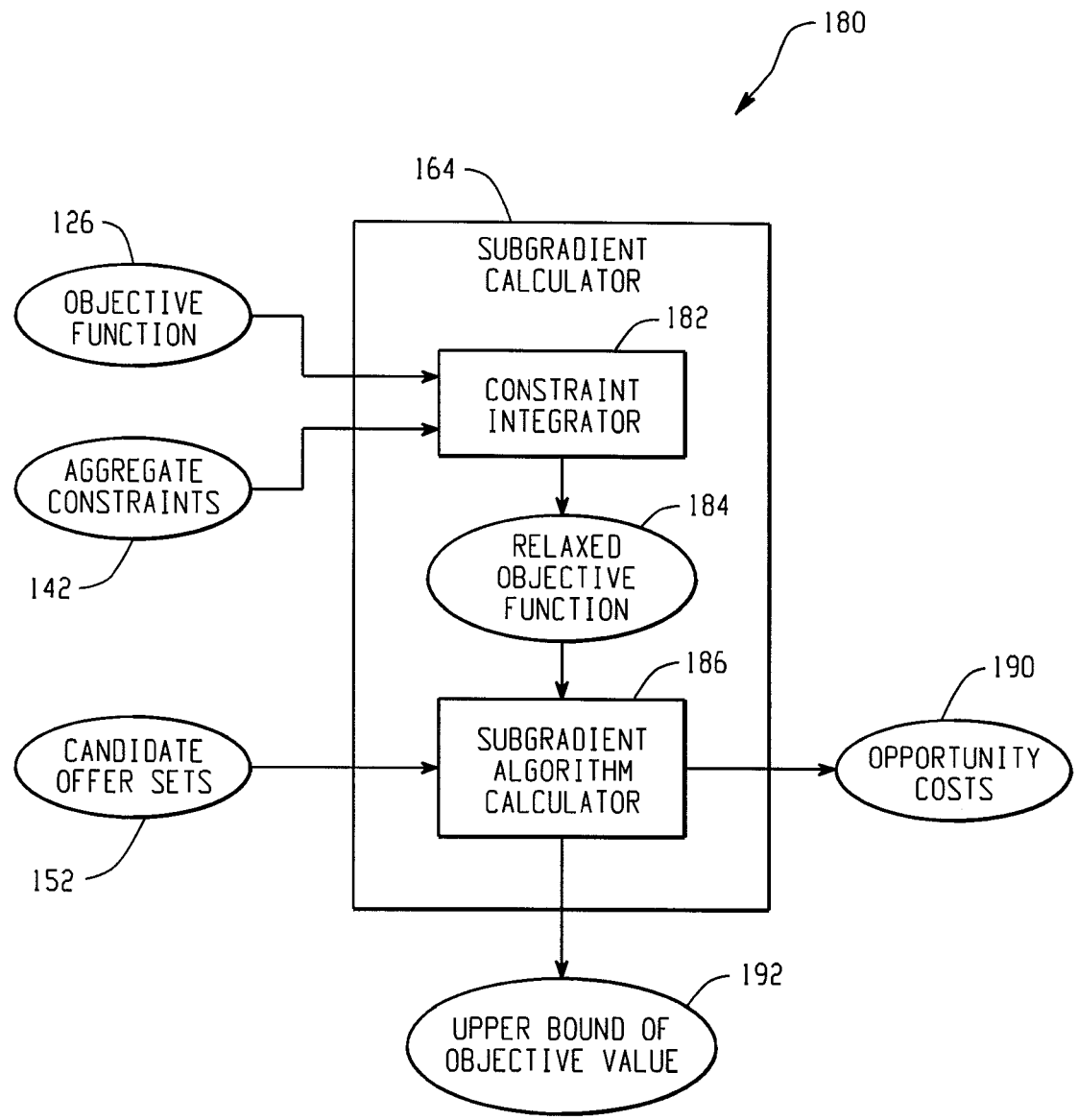
FIG. 10 is a flow diagram illustrating components within a subgradient calculator.

FIG. 10 is a flow diagram illustrating at 180 components within the subgradient calculator 164. The subgradient calculator 164 includes a constraint integrator 182 that receives the objective function 126 and the aggregate constraints 142. On or before the first traversal of the generate offer sets loop 146 for a customer, a Lagrange relaxation technique is applied to the objective function 126 to integrate the aggregate constraints 142 into the objective function 126 to produce the relaxed objective function 184. The constraint integrator 182 puts the aggregate constraints 142 into the objective function 126 by incorporating Lagrange multipliers which impose large penalties on the relaxed objective function 184 score if an aggregate constraint 142 is violated.

The subgradient algorithm calculator 186 operates on each iteration of the generate offer sets loop 146. The subgradient algorithm finds a minimum or maximum of the surface created by the combination of the relaxed objective function 184 and the candidate offer sets 152. Upon location of this minimum or maximum value, an upper bound of the objective value 192 is calculated. This upper bound of the objective value corresponds to the quality value described above with reference to FIG. 9. On the first iteration through the generate offer sets loop 146, this upper bound of the objective value 192 is stored. On subsequent iterations, the newly calculated upper bound of the objective value 192 is compared to the upper bound of the objective value 192 calculated on the previous iteration. If the difference between the two is relatively large, then the improvement between iterations is significant, and a further iteration is ordered. If the difference is small, then the improvement is not significant enough to warrant another traversal of the generate offer sets loop 146. The subgradient algorithm calculator 186 further calculates opportunity cost values 190. These opportunity cost values 190 are used to adjust the objective function coefficients in subsequent traversals of the generate offer sets loop 146 as described below. A subgradient algorithm is further discussed at: "Introduction to Linear Optimization," Bertsimas, Dimitris; Tsitsiklis, John N., Athena Scientific, Feb. 1, 1997, pp. 505-506, 530, the entirety of which is herein incorporated by reference.

Figure 11:
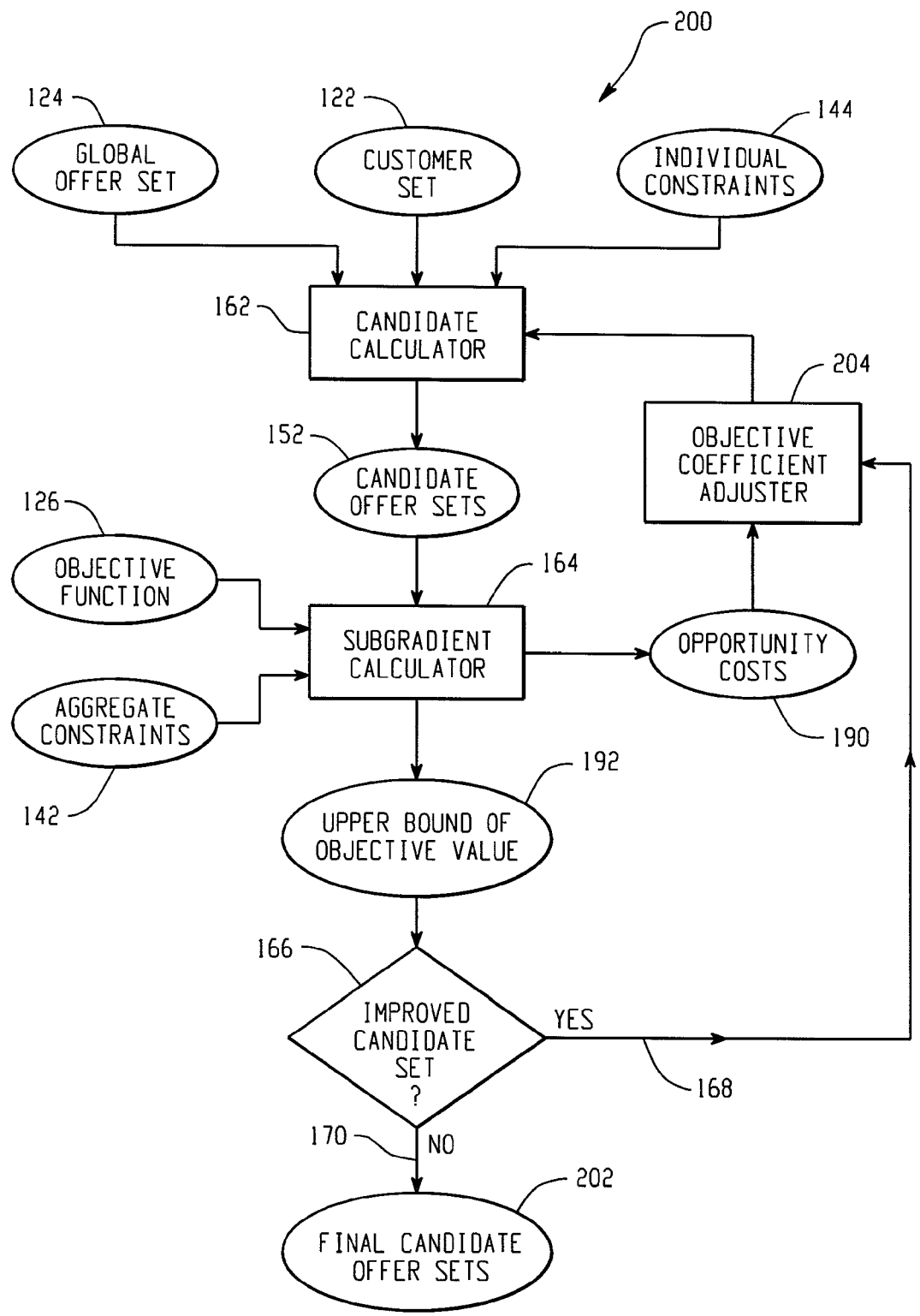
FIG. 11 is a block diagram illustrating the components utilized in generating final candidate offer sets.

FIG. 11 is a block diagram illustrating at 200 example components utilized in generating final candidate offer sets 202. The candidate calculator 162 receives the customer set 122, global offer set 124, and individual constraints 144 and outputs a first set of candidate offer sets 152. Each candidate offer set 152 generated by the candidate calculator 162 is appended to the final candidate offer sets 202 to be supplied to later selection modules. The subgradient calculator 164 receives the aggregate constraints 142 as well as the candidate offer sets 152 generated by the candidate calculator 162. The subgradient calculator outputs the upper bound of the objective value 192 as a quality indicator as well as opportunity costs 190 used to adjust the coefficients of the objective function 126 as described with reference to FIG. 10. At 166, a comparison is made between the upper bound of the objective value 192 calculated by the subgradient calculator 164 during the current iteration and the upper bound of the objective value 192 calculated on the previous iteration. If the difference between the two upper bounds is less than a threshold value, then the no branch 170 is taken and the final candidate offer sets 202 are output to later selection modules. If the difference between the two upper bounds is larger than the threshold value, then the yes branch 168 is taken. On the first iteration of the loop, the yes branch 168 is taken by default.

Upon indication of the yes branch 168 being taken, the objective function coefficients are adjusted at 204 in light of the opportunity costs calculated by the subgradient calculator 164. Opportunity costs are a vector of weights having one entry corresponding to each aggregate constraint. The opportunity costs are calculated using the subgradient algorithm. A weighted sum of the aggregate constraints using the opportunity costs as weights is used to adjust the objective function. The candidate calculator 162 generates a new set of candidate offers 152 in light of the adjusted objective function coefficients 204. These adjusted objective function coefficients 204 have the aggregate constraints 142 integrated based on the Lagrange relaxation applied to the objective function as described in FIG. 10. The consideration of the aggregate constraints 142 in subsequent iterations of the loop improves the likelihood that generated candidate offer sets 152 will be feasible in light of the aggregate constraints 142. The newly generated candidate offer sets 152 are appended to the final candidate offer sets 202, and the subgradient calculator 164 repeats its calculations in light of the newly generated candidate offer sets 152. If the new candidate offer sets 152 offer a significant improvement, then another iteration is performed. If the improvement is not above a pre-set threshold level, then the no branch is taken and the final candidate offer set 202 is propagated to downstream selection modules.

Figure 12:
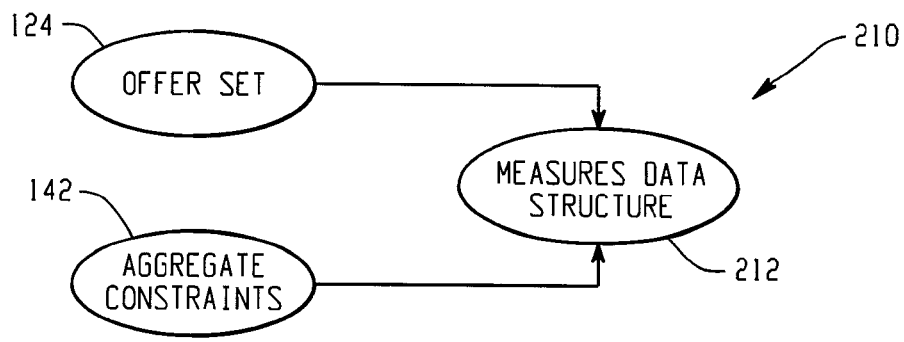
FIG. 12 is a flow diagram illustrating the inputs used to generate a measures data structure.

FIG. 12 is a flow diagram illustrating the inputs used to generate a measures data structure 212. In the original marketing optimization problem, the decision variable is whether an offer should be made to a customer or not. In the modified problem, however, the decision variable is whether an offer set should be made to a customer or not. Therefore, the objective and constraint coefficients have different meanings and need to be recalculated. For example, a customer is eligible for 5 offers: offer 2, 4, 5, 7, and 10. The corresponding coefficients of these offers are described below in Table 1.

TABLE 1

Example Objective and Constraint Coefficients

|  | Offer 2 | Offer 4 | Offer 5 | Offer 7 | Offer 10 |
| --- | --- | --- | --- | --- | --- |
| Objective | 0.005 | 0.001 | 0.013 | 0.006 | 0.009 |
| Constraint 1 | 1 | 0 | 0 | 1 | 1 |
| Constraint 2 | 4 | 0 | 2 | 0 | 0 |

In this example, three offer sets are generated for a customer. Offer set 1 contains offers 2 and 4; set 2 contains offers 2, 5, and 7; and set 3 contains offers 4, 5, and 10. The new objective and constraint coefficients are shown in Table 2.

TABLE 2

Example Objective and Constraint Coefficients for Offer Sets

|  | Solution 1 | Solution 2 | Solution 3 |
| --- | --- | --- | --- |
| Offers | Offer 2, 4 | Offer 2, 5, 7 | Offer 4, 5, 10 |
| Objective | 0.006 | 0.024 | 0.023 |
| Constraint 1 | 1 | 2 | 1 |
| Constraint 2 | 4 | 6 | 2 |

As can be seen from the above tables, there are several zero coefficients in the original problem described in Table 1, but none of the new coefficients in the master problem description of Table 2 are zero. In practice, although the new coefficients in the master problem may sometimes be zero, it is generally true that the master problem has a much denser coefficient matrix than the original problem. This is because the new coefficients are computed by combining the original coefficients. A new coefficient will not be zero if any coefficient in the set is not zero. This may present a problem in terms of both storage and computation.

As an illustration, a problem can involve two millions customers, twenty offers, fifty linking constraints, and ten offer sets are generated per customer. In the worst case, every constraint coefficient will not be zero in the master problem, which results in a total of 2,000,000*10*50=1 billion doubles and which requires ~120 G bytes of storage space. Because in-memory computation is difficult for 120 GB data, the data may be stored and operated from non-volatile memory. This creates computation bottleneck for the master problem since non-volatile memory I/O operations are time-expensive.

This difficulty may be overcome by taking advantage of the problem specific structure. An approach is to store the coefficients of the original problem and compute the new coefficients on the fly when they are needed in the master problem. This is based on the fact that the number of offers in offer sets is usually small. Typically one offer set contains less than 10-20 offers. Therefore, there is not much increase in terms of processor time if new coefficients are computed on the fly. This approach may decrease I/O time dramatically because explicit storage of the new coefficients not required.

The coefficients of the original problem require a lot of storage space if stored one by one. However, the constraints may be stored compactly by utilizing the approach of measures. For example, the following constraints may appear in a problem: the expected revenue of mortgage offers should be at least 500K; the expected revenue from direct mail should be at least 100K; and the expected revenue in the east region should be at least 800K. An approach is to store these values explicitly for each constraint. However, this is not efficient since some values may be stored multiple times in that they appear in multiple constraints. One such example is the expected revenue for mortgage offers offered in the east region through direct mail.

One solution is to store the values of measures instead of the actual constraint coefficients and have an indicator variable specifying in which constraints a measure is active. In the above example, the measure, "expected revenue" for all customers, is stored only once. The indicator variable is a binary string with "1" indicating the measure is active (included) in the constraint, "0" otherwise. Table 3 illustrates examples of the indicator variable.

TABLE 3

Compact Storage through Measures Data Structure

| Offer Type | Channel | Customer Region | Indicator Variable |
| --- | --- | --- | --- |
| Credit card | Direct mail | East | 011 |
| Mortgage | Call center | East | 101 |
| Credit card | Email | West | 000 |
| Mortgage | Direct mail | East | 111 |

In Table 3, the first row lists a credit card offer offered in the east region through direct mail. The corresponding indicator variable is 011, which means the "expected revenue" measure is active in the second and the third constraints, but not in the first. This is because the first constraint limits to mortgage offers only.

The indicator variable may be stored compactly if represented as bits. Thus, storing measures instead of constraint coefficients helps save memory space, which enables computation time to be sped up. As shown in FIG. 12 the global offer set 124 is combined with the aggregate constraints 142 to generate the measures data structure 212. The measures data structure 212 may be utilized by the generate offer sets step 146 to enable calculation of constraints in memory thereby alleviating the need for large amounts of costly non-volatile memory accesses.

Figure 13:
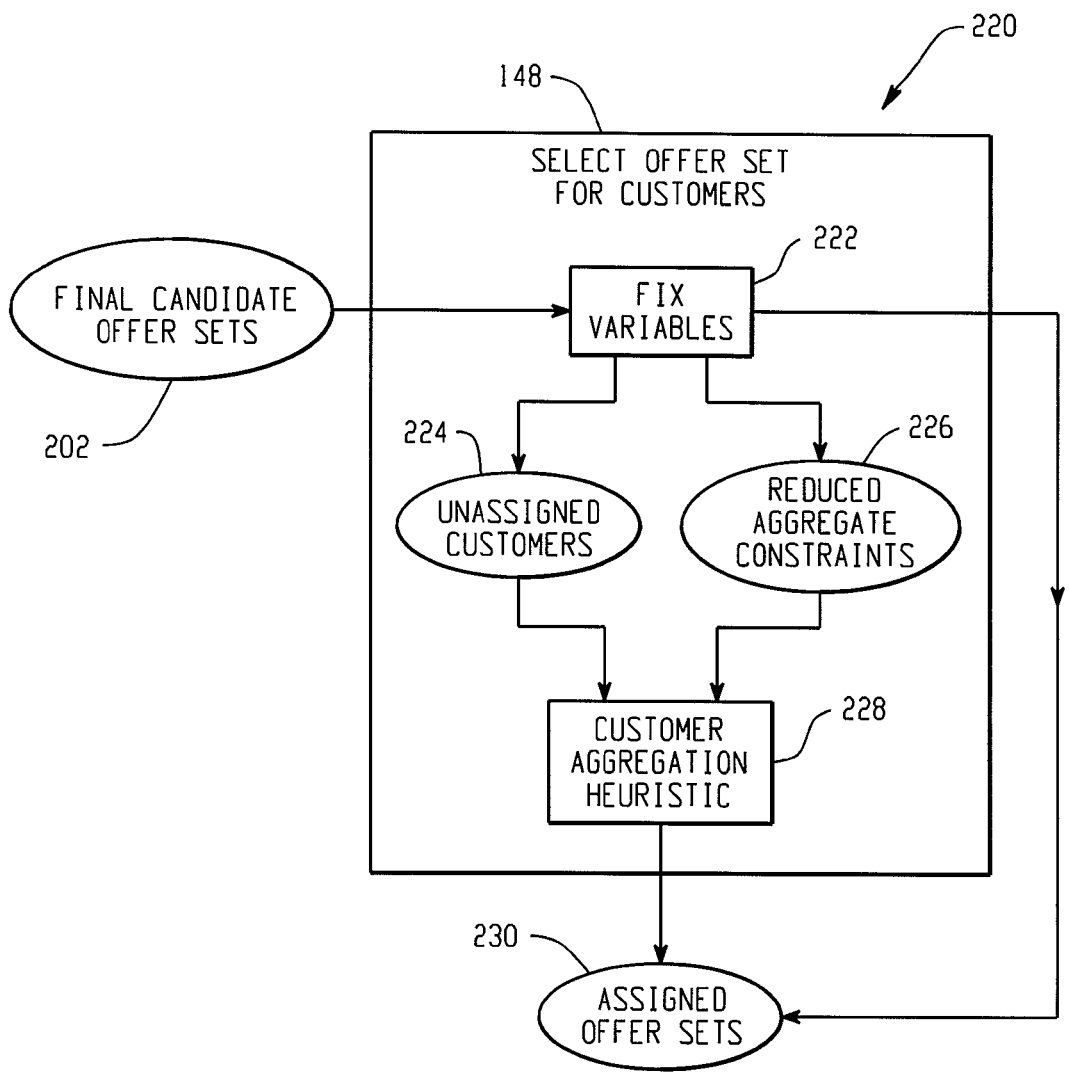
FIG. 13 is a flow diagram illustrating steps for selecting an offer set for customers from the final candidate offer sets.

FIG. 13 is a flow diagram illustrating at 220 steps for selecting an offer set for customers from the final candidate offer sets 202. Following generation of the final candidate offer sets 202, as described above, the select offer set for step 148 selects and assigns a single assigned offer set 230 for each customer. This assigned offer set 230 may be stored in memory for later execution of the marketing campaign. The step of selecting offer sets for customers may include a fix variables step 222. The fix variables step 222 may make a final assignment of offer sets 230 for some portion of the customers. This initial final assignment can be beneficial in that it reduces the number of customers, final candidate offer sets 202, and individual constraints that are to be later considered by the customer aggregation heuristic process 228. The offer sets 230 assigned in the fix variables step 222, may be selected based on their very high (or low) objective constraint value, the constraints with which the assigned offer set 230 is associated, as will be discussed further below.

The customers' final candidate offer sets 202 and individual constraints assigned in the fix variables step 222 are removed from further consideration, leaving the unassigned customers 224 and the reduced aggregate constraints for further processing by the customer aggregation heuristic process 228. The customer aggregation heuristic process 228 determines offer set assignments 230 for the remaining customers as described in FIGS. 15 and 16.

Figure 14:
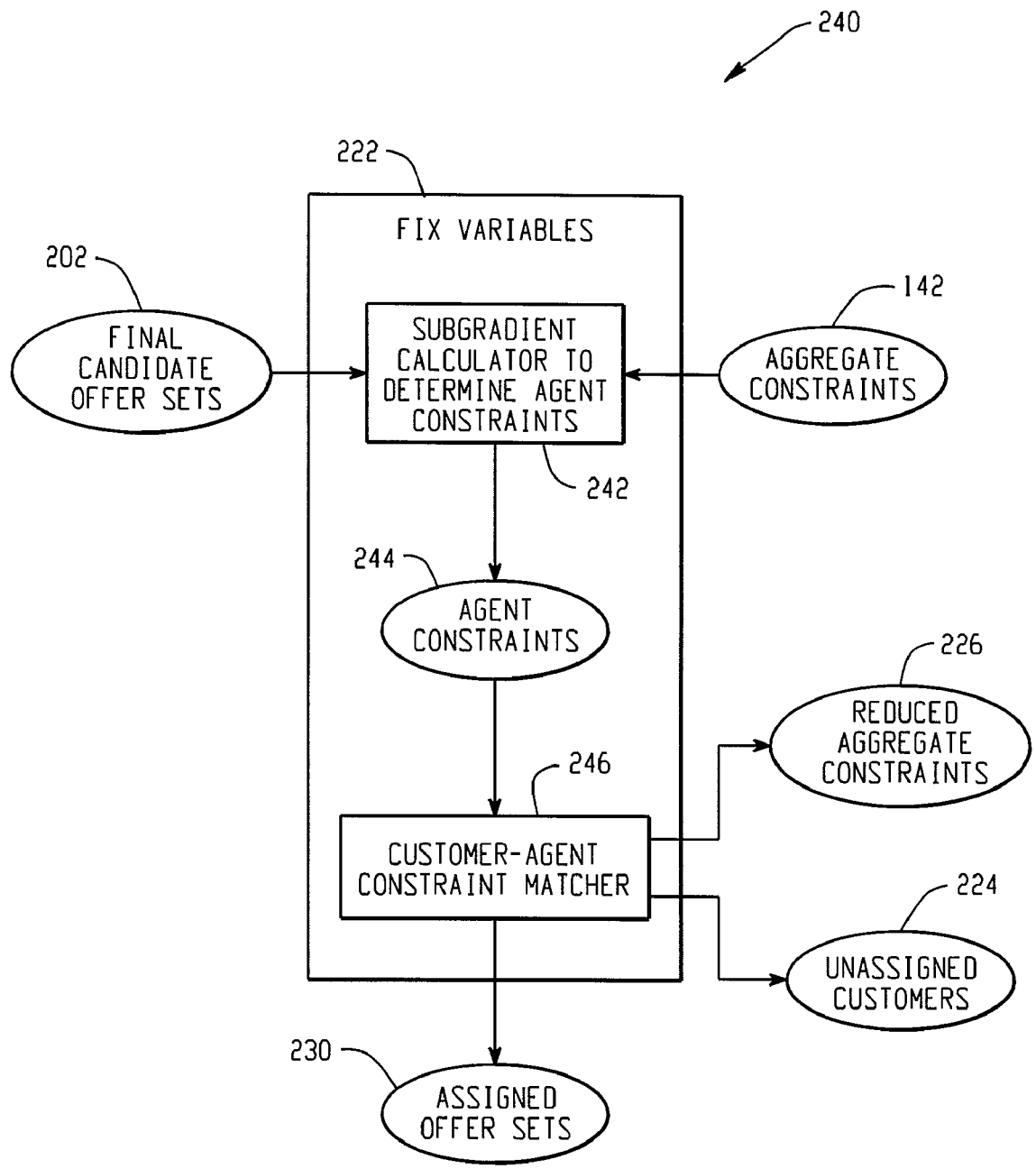
FIG. 14 is a block diagram illustrating example components within a fix variables step.

FIG. 14 is a block diagram illustrating at 240 example components within the fix variables step 222. In the example of FIG. 14, a subgradient calculator 242 receives the final candidate offer sets 202 and the aggregate constraints 142 including a set of identified agent constraints 244. Agent constraints typically are constraints that are at their bounds in a final solution to the marketing optimization problem. The number of customers to which a personal banking representative is capable of calling and making an offer is an example of an agent constraint. Because the number of constraints and customers remaining in the problem increases complexity and computation time, removing a portion of these values from the problem may improve performance. By pre-filling constraints that would likely be filled following a rigorous optimization solving before optimization, performance of optimization procedures may be improved.

In the example method of fixing variables, a subgradient procedure 242 is applied to the final candidate offer sets 202 and the identified agent constraints 244 to identify which of the agent constraints will be at their bound and are good candidates for variable fixing. The subgradient is the vector of constraint violation corresponding to a solution x. An average value $G_i$, which is the subgradient restricted to constraint i, is computed for each aggregate constraint i in the problem. All constraints that have only positive coefficients and a positive right hand side limit value form a set P of agent constraints. A subset B of the constraints from P that have a negative average gradient value $G_i$ are selected. These selected constraints in B are likely to be at their bounds in the final solution and, thus, are good candidates for elimination.

After one or more agent constraints 244 are identified, a number of offer sets for customers from the final candidate offer sets are matched to the agent constraints at 246. One method of accomplishing this matching is, for each customer, to pick the offer set that has a calculated highest adjusted objective value that affects one of the agent constraints 244 that does not violate any of the other aggregate constraints, if such an offer set exists. The customer is then assigned this offer set and is removed from further calculations in the problem. The process is repeated for each customer until the agent constraint is satisfied (e.g., filled), and the agent constraint may then be removed from future calculations, thereby simplifying the problem. Following the customer—agent constraint matching step 246, the unassigned customers 224 and the reduced aggregate constraint set 226 are provided to the customer aggregation heuristic process 228.

Figure 15:
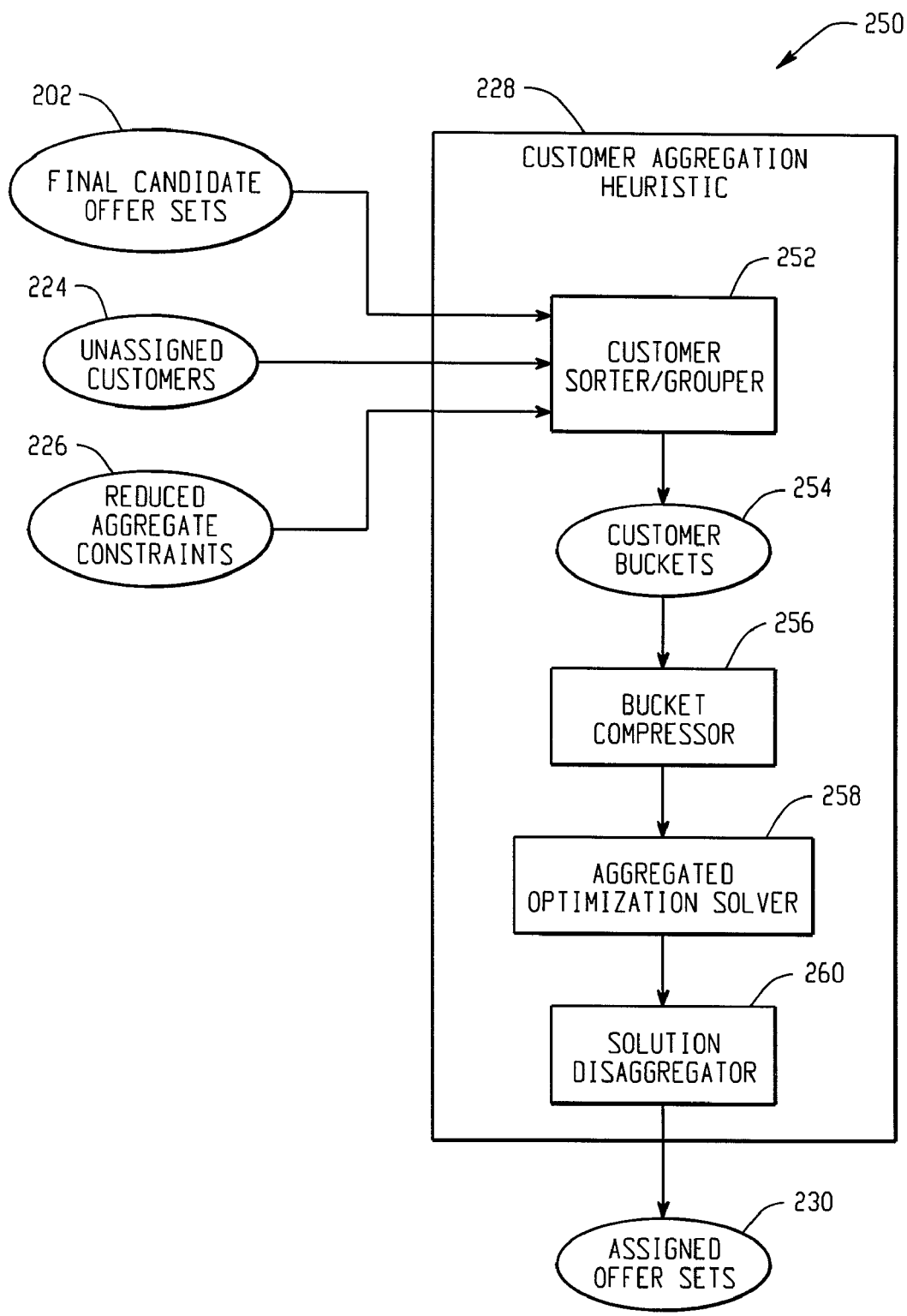
FIG. 15 is a block diagram illustrating example components within a customer aggregation heuristic.

FIG. 15 is a block diagram illustrating at 250 example components within the customer aggregation heuristic process 228. In the customer aggregation heuristic process 228, any unassigned customers 224, reduced aggregate constraints 226, and final candidate offer sets 202 are received by a customer sorter/grouper process 252. It should be noted, that the customer aggregation heuristic process 228 may be utilized without a prior execution of a fix variables step 222. In that case, a full set of customers, aggregate constraints, and final candidate offer sets may be received by the customer sorter/grouper process 252. Following input receipt, the customer sorter/grouper process 252 calculates a adjusted objective value for each of the final candidate offer sets 202 for each customer. Customers having the same number of eligible offers are grouped together. Each group forms a set $S_i$ with each customer in the set eligible for i offers, i=1, 2, ..., k, where k is the maximum number of eligible offers for all the customers.

Customers in each set are further grouped into sets $T_{ij}$ such that offer j has the highest adjusted objective value for each customer in $T_{ij}$. Customers in $T_{ij}$ are then sorted in descending order of their highest adjusted objective value. Based on a user-definable input parameter, customers in each set $T_{ij}$ are partitioned into buckets having a certain number of customers per bucket as shown at 254. All customers in each bucket are eligible for the same number of offers with a matching offer number for the offer with the highest adjusted objective value. For example, a bucket having three customers, each eligible for three offers, and each customer having offer_1 as their highest adjusted objective value offer may be represented as:

Customer1: (offer_1, offer_5, offer_8)
Customer2: (offer_1, offer_4, offer_7)
Customer3: (offer_1, offer_6, offer_8)

The data in each customer bucket 254 is then aggregated by a bucket compressor 256. The new aggregated customer unit has the same number of columns as the number of eligible offers for the customers in the cluster. For the above example, the new aggregated customer unit, Customer_123, may be represented as:

Customer_123: (offer_1*, offer_2*, offer_3*),
where offer_1* corresponds to offer_1; offer_2* corresponds to the aggregated data from offer_5, offer_4, and offer_6; and offer_3* corresponds to the aggregated data from offer_8, offer_7, and offer_8 for customers 1, 2, and 3 respectively.

Following compression of the buckets 256, the model is solved 258 using an integer programming heuristic to obtain an optimal solution for the aggregated problem. For example, an integer programming heuristic may, as a first step, solve a linear programming relaxation of the aggregated problem. Most of the variables that take integer values are then fixed and the remaining, smaller problem is solved using an integer programming solver, such as the SAS® OPTMILP procedure, to obtain an integral solution for the aggregated problem. The SAS® OPTMILP procedure is described in "SAS/OR® 9.1.3 User's Guide: Mathematical Programming 3.1," SAS® Publishing, 2007, Cary, N.C., pp. 1068-1074, which is herein incorporated by reference in its entirety. The disaggregating step 260 produces a feasible solution for the marketing optimization problem.

For the above example, if the integer solution corresponding to the variables in Customer_123 is (0,1,0), then the disaggregating step would make offer_5 to customer 1, offer_4 to customer 2, and offer 6 to customer 3. Because the aggregation is done by adding corresponding data entries for the offers for each customer in a bucket, the disaggregated solution for the problem will be feasible in light of the constraints if the aggregated problem is feasible.

The quality of the solution produced by the clustering procedure depends in part on the quality of the clustering and the number of customers per cluster. A small number of customers per cluster tends to give better results. However, for large instances with tens of millions of customers it is noted that the optimization step may become excessively computationally expensive using small clusters.

Figure 16:
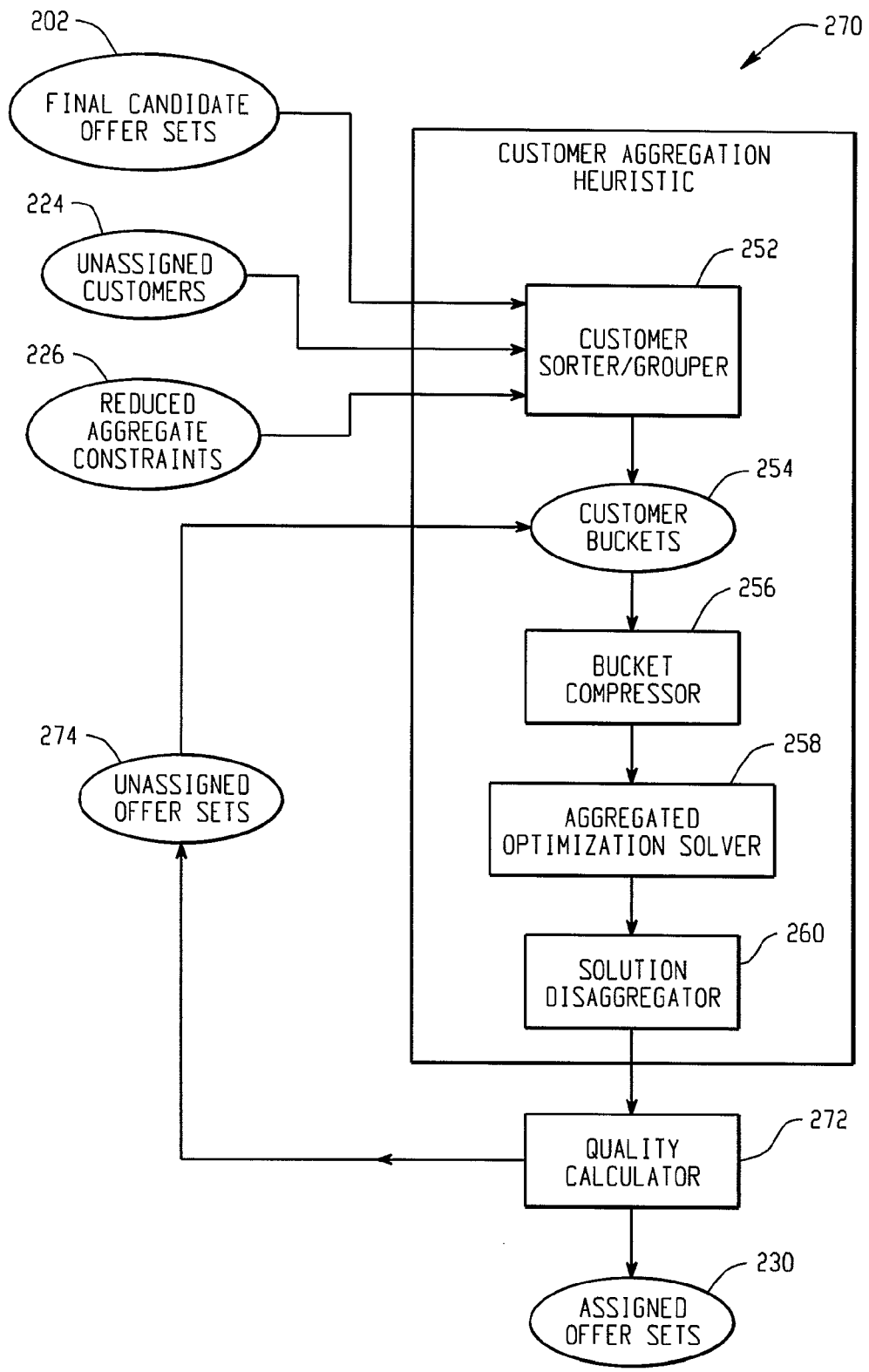
FIG. 16 is a block diagram illustrating example components within an iterative customer aggregation heuristic.

FIG. 16 is a block diagram illustrating at 270 example components within an iterative customer aggregation heuristic process 228. In this approach, a fast solution is generated by choosing a large number of customers per bucket as shown at 252 and 254. The large buckets are compressed 256, solved 258, and disaggregated 260 in a similar fashion as described with respect to FIG. 15. At 272, quality calculations are made to identify a subset of the solution that is good. The quality calculation selects only those offers made in the disaggregating step which have maximum adjusted objective coefficients. This good subset is saved as assigned offer sets 230, and the customers 224, offer sets, and individual constraints associated with the assigned offer sets 230 are removed from further considerations.

The number of remaining customers and unassigned offer sets 274 will be smaller than the original set of customers 224 and final candidate offer sets 202, respectively. The customer aggregation heuristic steps of sorting/grouping 252, bucket compression 256, solving 258, and disaggregating 260 are repeated using the reduced customer and offer sets with a smaller bucket size. The reduced customer and offer sets make the processing with the smaller bucket size feasible, and the smaller bucket size improves the solution quality for the remaining customers. The quality calculation 272 and loop is repeated a user-definable number of times over which each customer is assigned an offer set 230. The quality calculator 272 may choose a certain portion of the disaggregated solutions 260 on each iteration as good (e.g., 50%), or the calculator 272 may require a quality score over a certain threshold for an assignment to be retained. On the final iteration, all remaining customers may be assigned an offer set 230.

Figure 17:
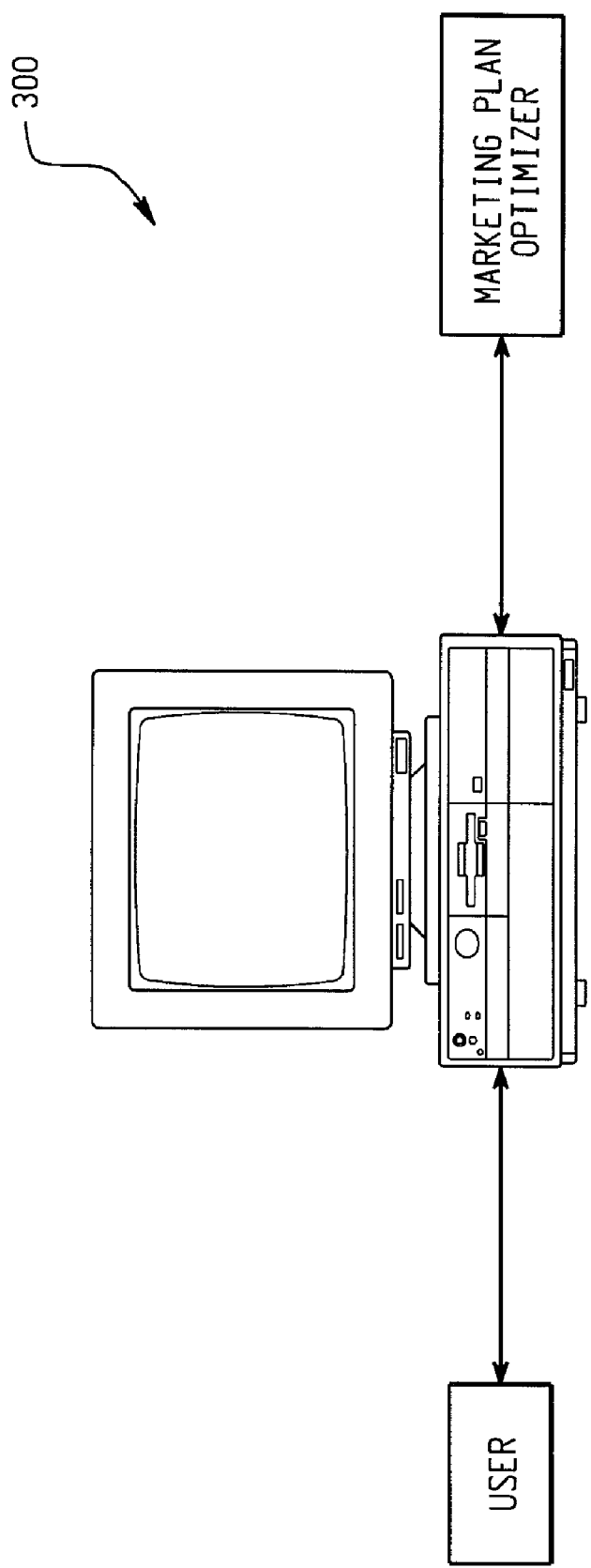
FIG. 17 is a block diagram depicting an environment wherein a user can interact with a marketing plan optimizer.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a single general purpose computer or workstation (as shown at 300 on FIG. 17), or on a networked system, or in a client-server configuration, or in an application service provider configuration.

Further the systems and methods encompass applications outside of direct marketing optimization applications. These systems and methods may be utilized in many situations where a number of entities are to be matched with a number of possible options while satisfying global and individual constraints. For example, the systems and methods could be utilized in a scenario where increases in credit limits for a number of consumers are considered. Aggregate constraints could include the number of credit card limit increases applied. Individual constraints could include minimum and maximum credit scores required to receive a credit limit upgrade. Many other applications of the systems and methods may be apparent to one skilled in the art where a near-optimum solution is required to a very large scale problem.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for determining an offer set, comprising:
   accessing, using one or more data processors, a global set of action items, wherein the global set includes assignable marketing action items, and wherein action items are assignable to a plurality of customers;
   generating, using the one or more data processors, initial offer sets for each customer using an objective function and one or more individual constraints, wherein an initial offer set includes one or more action items, and wherein an individual constraint limits assignable action items for a customer;
   adjusting, using the one or more data processors, the objective function using one or more aggregate constraints and a Lagrange relaxation technique, wherein an aggregate constraint limits assignable action items for a plurality of customers;
calculating, using the one or more data processors, initial quality values for the initial offer sets using the adjusted objective function and a subgradient algorithm;
generating, using the one or more data processors, revised offer sets for each customer using the adjusted objective function;
calculating, using the one or more data processors, revised quality values for the revised offer sets using the adjusted objective function and the subgradient algorithm; and
determining, using the one or more data processors, an offer set for each customer using the initial quality values and the revised quality values, wherein each offer set is selected from the initial offer sets or from the revised offer sets.

2. The method of claim 1, wherein current customers and subsequent customers are associated with one or more particular individual constraints, and wherein each customer associated with the particular individual constraints is assigned one of a pool of offer sets associated with the particular individual constraints.

3. The method of claim 1, wherein the Lagrange relaxation technique includes a linear programming relaxation technique.

4. The method of claim 1, wherein the Lagrange relaxation technique uses an OCTANE heuristic.

5. The method of claim 1, further comprising:
determining an estimated value for each of the plurality of customers; and
assigning the plurality of customers into buckets based upon the estimated values, wherein a particular offer set for a customer is generated based upon a bucket assigned to the customer.

6. The method of claim 5, wherein the particular offer set for the bucket is selected using an integer programming heuristic.

7. The method of claim 1, wherein determining the offer sets for each customer includes using a gradient constraint fixing heuristic.

8. The method of claim 1, wherein the aggregate constraints include an agent constraint.

9. The method of claim 8, wherein the agent constraint identifies a maximum number of customers that an agent is permitted to contact.

10. A system for determining an offer set, comprising:
one or more processors;
one or more computer-readable storage mediums containing instructions configured to cause the one or more processors to perform operations including:
accessing a global set of action items, wherein the global set includes assignable marketing action items, and wherein action items are assignable to a plurality of customers;
generating initial offer sets for each customer using an objective function and one or more individual constraints, wherein an initial offer set includes one or more action items, and wherein an individual constraint limits assignable action items for a customer;
adjusting the objective function using one or more aggregate constraints and a Lagrange relaxation technique, wherein an aggregate constraint limits assignable action items for a plurality of customers;
calculating initial quality values for the initial offer sets using the adjusted objective function and a subgradient algorithm;
generating revised offer sets for each customer using the adjusted objective function;
calculating revised quality values for the revised offer sets using the adjusted objective function and the subgradient algorithm; and
determining an offer set for each customer using the initial quality values and the revised quality values, wherein each offer set is selected from the initial offer sets or from the revised offer sets.

11. The system of claim 10, wherein current customers and subsequent customers are associated with one or more particular individual constraints, and wherein each customer associated with the particular individual constraints is assigned one of a pool of offer sets associated with the particular individual constraints.

12. The system of claim 10, wherein the Lagrange relaxation technique includes a linear programming relaxation technique.

13. The system of claim 10, wherein the Lagrange relaxation technique uses an OCTANE heuristic.

14. The system of claim 10, wherein the operations further include:
determining an estimated value for each of the plurality of customers; and
assigning the plurality of customers into buckets based on the estimated values, wherein a particular offer set for a customer is generated based on a bucket assigned to the customer.

15. The system of claim 14, wherein the particular offer set for the bucket is selected using an integer programming heuristic.

16. The system of claim 10, wherein determining the offer sets for each customer uses a gradient constraint fixing heuristic.

17. The system of claim 10, wherein the linking constraints further include an agent constraint.

18. The system of claim 17, wherein the agent constraint identifies a maximum number of customers that an agent is permitted to contact.

19. A computer-program product for determining an offer set, tangibly embodied in a machine-readable storage medium, including instructions configured to cause a data processing apparatus to:
access a global set of action items, wherein the global set includes assignable marketing action items, and wherein action items are assignable to a plurality of customers;
generate initial offer sets for each customer using an objective function and one or more individual constraints, wherein an initial offer set includes one or more action items, and wherein an individual constraint limits assignable action items for a customer;
adjust the objective function using one or more aggregate constraints and a Lagrange relaxation technique, wherein an aggregate constraint limits assignable action items for a plurality of customers;
calculate initial quality values for the initial offer sets using the adjusted objective function and a subgradient algorithm;
generate revised offer sets for each customer using the adjusted objective function;
calculate revised quality values for the revised offer sets using the adjusted objective function and the subgradient algorithm; and
determine an offer set for each customer using the initial quality values and the revised quality values, wherein each offer set is selected from the initial offer sets or from the revised offer sets.

* * * * *